United States Patent
Zhang

(10) Patent No.: US 9,809,112 B2
(45) Date of Patent: Nov. 7, 2017

(54) HORIZONTAL SHAFT FUEL TANK CAP WITH CHARCOAL CANISTER

(71) Applicant: CHONGQING FENGRUI PLASTIC Co., Ltd., Chongqing (CN)

(72) Inventor: Yi Zhang, Chongqing (CN)

(73) Assignee: CHONGQING FENGRUI PLASTIC Co., Ltd., Chongqing (CN)

( * ) Notice: Subject to any disclaimer, the term of this patent is extended or adjusted under 35 U.S.C. 154(b) by 1 day.

(21) Appl. No.: 14/771,862

(22) PCT Filed: Mar. 30, 2015

(86) PCT No.: PCT/CN2015/075364
§ 371 (c)(1),
(2) Date: Sep. 1, 2015

(87) PCT Pub. No.: WO2016/127474
PCT Pub. Date: Aug. 18, 2016

(65) Prior Publication Data
US 2016/0361995 A1     Dec. 15, 2016

(30) Foreign Application Priority Data

Feb. 13, 2015   (CN) .......................... 2015 1 0080707

(51) Int. Cl.
*B60K 15/05*  (2006.01)
*B60K 15/04*  (2006.01)
(Continued)

(52) U.S. Cl.
CPC ...... *B60K 15/0406* (2013.01); *B01D 53/0407* (2013.01); *B01D 53/0423* (2013.01);
(Continued)

(58) Field of Classification Search
CPC ................ B01D 53/04; B01D 53/0423; B01D 2253/102; B01D 2257/708;
(Continued)

(56) References Cited

U.S. PATENT DOCUMENTS

2009/0126699 A1    5/2009  Rumpf
2009/0294450 A1*  12/2009  Schmalz ............ B60K 15/0406
                                                  220/371
(Continued)

FOREIGN PATENT DOCUMENTS

CN          2886105 Y     4/2007
CN        104210357 A    12/2014
(Continued)

*Primary Examiner* — Frank Lawrence
(74) *Attorney, Agent, or Firm* — Andrew W. Chu; Craft Chu PLLC

(57) ABSTRACT

The horizontal shaft fuel tank cap with charcoal canister includes a fuel tank inner cap and fuel tank outer cap. A hollow room with an upper opening is disposed in the center of the fuel tank inner cap. The fuel tank outer cap is disposed above the fuel tank inner cap. The ventilating pipe is disposed in the hollow room and divides the hollow room into filling room and containing room. The first air outlet leading the fuel vapor to the containing room is disposed on the bottom of the containing room. The second air outlets are disposed in the center of the ventilating pipe. The fuel-absorption substrate is disposed in the filling room. The residuary fuel is drained into the fuel tank under negative pressure of the fuel tank. The filtering performance of charcoal powder can be enhanced since it is exempted from long-time fuel soaking.

10 Claims, 2 Drawing Sheets

(51) Int. Cl.
  *B01D 53/04* (2006.01)
  *B60K 15/035* (2006.01)
(52) U.S. Cl.
  CPC .. *B60K 15/03504* (2013.01); *B01D 2253/102* (2013.01); *B01D 2257/702* (2013.01); *B01D 2257/708* (2013.01); *B01D 2259/4516* (2013.01)
(58) Field of Classification Search
  CPC ........ B01D 2259/4516; B60K 15/0406; B60K 15/03504
  USPC .............. 95/146; 96/134, 147; 123/518, 519
  See application file for complete search history.

(56) References Cited

U.S. PATENT DOCUMENTS

2011/0290118 A1* 12/2011 Tanaka ................... B60K 15/04
  96/139
2013/0001229 A1* 1/2013 Wang ................. F02M 25/0854
  220/373
2016/0243489 A1* 8/2016 Yi .......................... B65D 51/16

FOREIGN PATENT DOCUMENTS

| CN | 204136770 U | 2/2015 |
| CN | 204140249 U | 2/2015 |
| CN | 2014140248 U | 2/2015 |
| CN | 204553019 U | 8/2015 |

\* cited by examiner

HORIZONTAL SHAFT FUEL TANK CAP WITH CHARCOAL CANISTER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a horizontal shaft fuel tank cap with charcoal canister.

2. Description of Related Art Including Information Disclosed Under 37 CFR 1.97 and 37 CFR 1.98

In the current market, most fuel tank caps contain a containing room or containing cavity filled by charcoal powder. When the inner pressure of the fuel tank is higher than the outer pressure, to achieve internal-external pressure balance, the fuel vapor in the fuel tank passes through and gets filtered by charcoal powder. Then, the filtered fuel vapor is discharged to the atmosphere to achieve the goals of emission control and less environment pollution. However, not all fuel vapor can be absorbed in this way. When the inner temperature is too high, or there is too much vibration within the fuel tank, some liquid fuel enters the containing cavity, soaks the charcoal powder for long time, and then undermines the filtering performance of the charcoal powder.

BRIEF SUMMARY OF THE INVENTION

The present invention solves the current technology problem by providing a horizontal shaft fuel tank with charcoal canister.

The invention includes a horizontal shaft fuel tank cap with a charcoal canister. The cap includes a fuel tank inner cap and a fuel tank outer cap. The hollow room or hollow cavity with an upper opening is disposed in the center of the fuel inner cap. The fuel tank outer cap covering the upper opening of the hollow cavity is disposed above the fuel tank inner cap. The ventilating pipe is disposed in the hollow cavity and divides the hollow cavity into a filling room or a filling cavity and a containing room or containing cavity. The filling cavity is disposed above the containing cavity. The first air outlet leading the fuel vapor to the containing cavity is disposed on the bottom of the containing cavity. The second air outlet leading fuel vapor from the containing cavity to the filling cavity is disposed in the center of the ventilating pipe. The fuel-absorption substrate is disposed in the filling cavity.

The present invention has the advantage that the residual fuel in the containing cavity and the filling cavity, through the first air outlet on the bottom of the containing cavity, is drained completely and quickly into the fuel tank under the negative pressure of the fuel tank, when the gasoline engine stops. The horizontal shaft fuel tank cap has better charcoal powder filtering performance with less environment pollution.

DETAILED DESCRIPTION OF THE INVENTION

The following description of the embodiments of the present invention is intended to illustrate and not to limit this invention.

Figure 1:
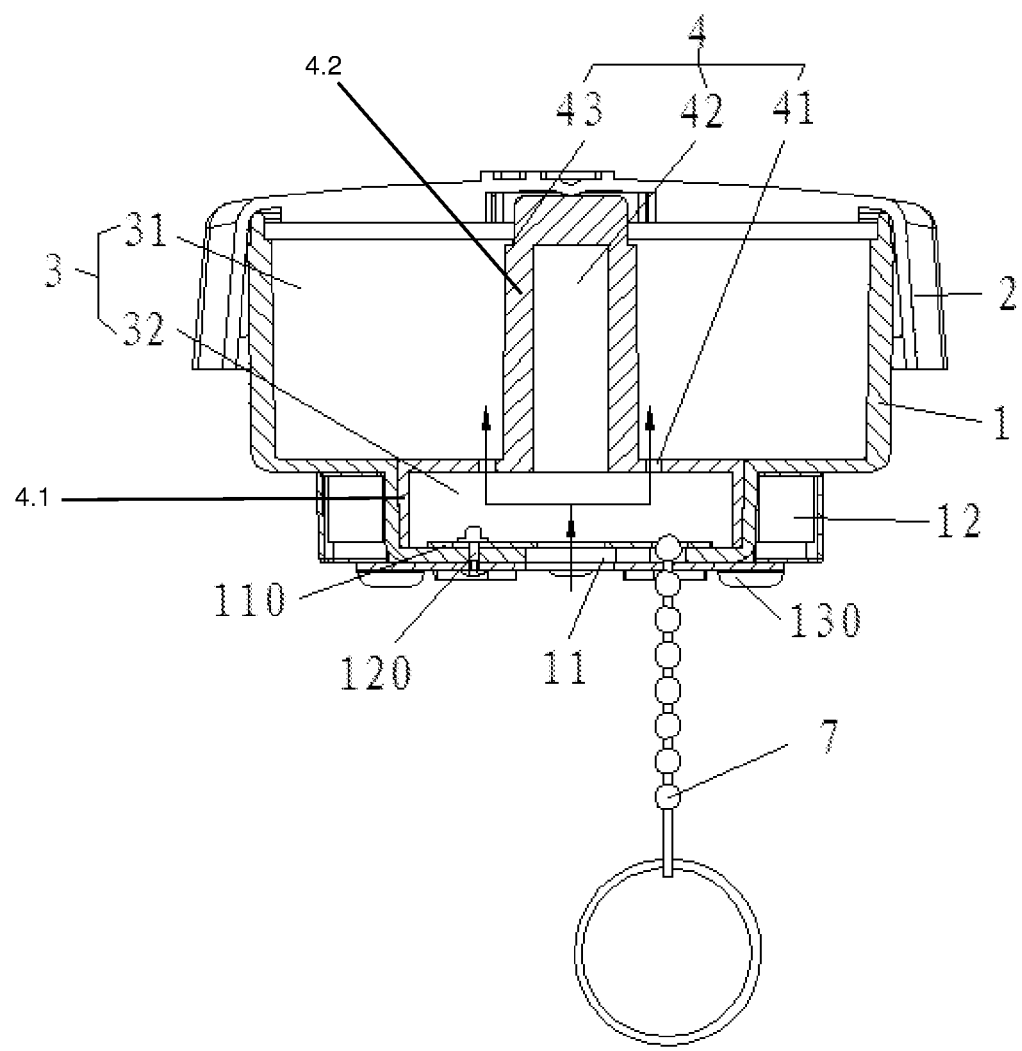
FIG. 1 is a structural schematic view of the present invention.
Figure 2:
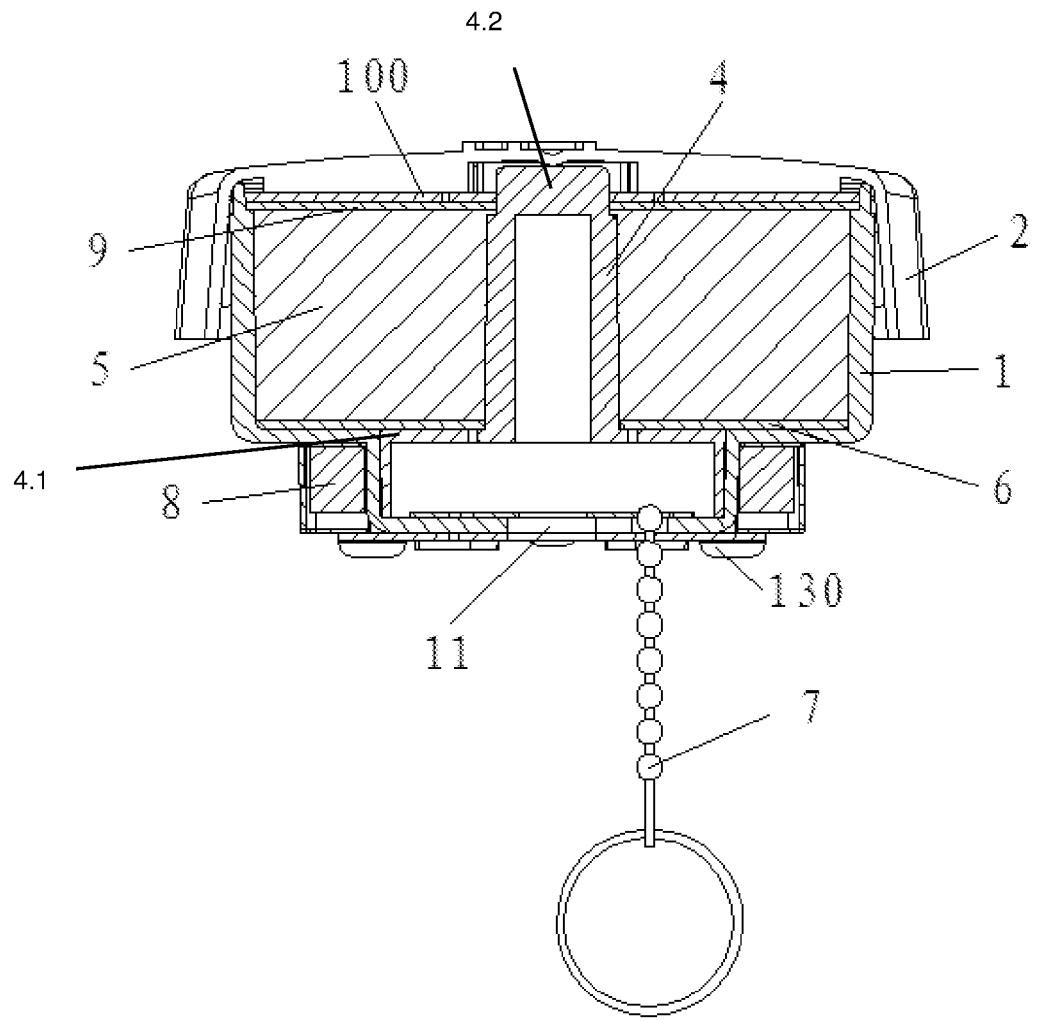
FIG. 2 is the structural schematic view of the present invention with a fuel-absorption substrate.

FIG. 1 and FIG. 2 show the horizontal shaft fuel tank cap with a charcoal canister, comprising a fuel tank inner cap 1, and the fuel tank outer cap 2. The hollow room or cavity 3 with an upper opening is disposed in the center of the fuel tank inner cap 1.

The fuel tank outer cap 2 covering the upper opening of the hollow room or cavity 3 is disposed above and is non-hermetically connected with the fuel tank inner cap 1, thus the filtered fuel vapor can be discharged easily. The inner wall of the fuel tank outer cap 2 and the upper end of the fuel tank inner cap 1 are in a clamping engagement.

The ventilating or vent pipe 4 is disposed in the hollow room or cavity 3. The vent pipe 4 has a bottom end contacting the bottom of the hollow room or cavity 3, and an upper end contacting the bottom of the fuel tank outer cap 2. The ventilating or vent pipe 4 divides the hollow room or cavity 3 into the filling room or filling cavity 31 and the containing room or containing cavity 32. The filling room or cavity 31 is disposed above the containing room 32 or cavity. The bottom end of the ventilating pipe 4 is inverted into the containing room or cavity 32. The outer wall of the ventilating pipe 4 and the inner wall of the containing room or cavity 32 are hermetically sealed.

Furthermore, the groove 42 connecting with the containing room or cavity 32 is disposed in the upper center of the ventilating or vent pipe 4. Thus, the weight of the ventilating or vent pipe 4 can be reduced, and the volume of the containing room or cavity 32 can be increased.

The fuel-absorption substrate 5 is disposed in the filling room or filling cavity 31. The fuel vapor is filtered by the fuel-absorption substrate 5 in the filling room or filling cavity 31, and then discharged to the atmosphere, to achieve the goals of controlling emission and reducing pollution. In some embodiments, the fuel-absorption substrate 5 is activated charcoal.

The first air outlet 11 is disposed on the bottom of the containing room or containing cavity 32. The first air outlet 11 leads the vapored fuel to the containing room or containing cavity 32, and ensures that the residual fuel in the containing room or containing cavity 32 is drained completely and quickly into the fuel tank under the negative pressure of the fuel tank. There is better absorption of the activated charcoal and less environmental pollution.

The second air outlets 41 are disposed in the center of the ventilating or vent pipe 4. A plurality of second air outlets 41 leads the fuel vapor from the containing room or containing cavity 32 into the filling room or filling cavity 31.

The first breathing board 6, with the fuel-absorption substrate 5 above, covering the second air outlets 41, is disposed above the bottom of the filling room or filling cavity 31. The first breathing board 6 of two-layer non-woven cloth functions to double filter the fuel vapor entering the filling room or filling cavity 31 from the containing room or containing cavity 32, and to prevent the charcoal powder from entering the filling room or filling cavity 31 to the fuel tank, which could block carburetor.

The embodiment also includes the second breathing board 9, covering the fuel-absorption substrate 5, which is preferred as two-layer non-woven cloth and disposed above the upper end of the filling room or filling cavity 31. The second breathing board 9 prevents leakage of the fuel-absorption substrate 5.

In some embodiments, the platform supporting the second breathing board 9 is disposed around the upper end of the filling room or filling cavity 31, and a protrusion or reinforcing rib is disposed on the bottom of the fuel tank outer cap 2 to push the second breathing board 9 downwards. The boss supporting the second breathing board 9 is disposed on the ventilating or vent pipe 4.

The upper end 43 of the ventilating or vent pipe 4 can either intersect or not intersect the second breathing board 9. In the embodiment of FIG. 2, the ventilating or vent pipe 4 intersects the second breathing board 9 until it reaches and contacts the bottom of the fuel outer cap 2. The ventilating pipe 4 supports not only the second breathing board 9, but also the fuel tank outer cap 2.

The slot 12 with the O-ring 8 inside, is disposed on the bottom of the fuel tank inner cap 1, to connect with an actual fuel tank, thus reducing environmental pollution caused by the liquid fuel/fuel vapor non-filtered by the fuel-absorption substrate 5 in the filling room or filling cavity 31.

The separating pad 100 is disposed between the fuel tank outer cap 2 and the second breathing board 9. The separating pad 100 pushes the second breathing board 9 downwards to prevent the leakage of fuel-absorption substrate 5.

The embodiments may also include the stainless steel pad 110, which is connected to the bottom of the containing room 32 by the stainless steel rivet 120. The stainless steel rivet 120 intersects the bottom of the containing room or containing cavity 32, and an upper end of the stainless steel rivet 120 is in the containing room or containing cavity 32. The stainless steel rivet 32 functions to not only connect the containing room or containing cavity 32, but also to drain any deposited liquid fuel in the containing room or containing cavity 32.

The embodiment also includes the spring pad 130, which is disposed under the fuel tank inner cap 1.

The embodiment also includes the anti-drop chain 7, which is disposed and connected to the bottom of the fuel tank inner cap 1.

In the embodiment of FIG. 2, the ventilation or vent pipe 4 includes the big or first supporting column 4.1 and a small or second supporting column 4.2. The second smaller supporting column 4.2 is disposed above the first bigger supporting column 4.1. The bigger supporting column 4.1 is disposed in the containing room or containing cavity 32, and the smaller supporting column 4.2 is disposed in the filling room or filling cavity 31. A plurality of second air outlets 41 are disposed on the upper end of the bigger supporting column 4.1, and the upper end of the bigger supporting column 4.1 is at the same level as the bottom of the containing room or cavity 31. The groove 42 is disposed within the smaller supporting column 4.2.

The little liquid fuel and fuel vapor, arising from the fuel tank during operation, follows a flow path of liquid fuel/fuel vapor through the first air outlet 11, the containing room or containing cavity 32, the second air outlets 41, the first breathing board 6, the filling room or filling cavity 31, and the fuel-absorption substrate 5. That little liquid fuel and fuel vapor is filtered and discharged to the atmosphere through the second breathing board 9 and a small pore on the separating pad 100.

There is the little liquid fuel stored in the containing room 32 during the working process. When the gasoline engine stops, following the flow of liquid fuel/fuel vapor, the little liquid fuel is residual in the containing room or containing cavity 32 and is drained completely and quickly into the fuel tank under the negative pressure of the fuel tank, for better absorption function of the activated charcoal, and less environment pollution.

When positive pressure or negative pressure occurs in the fuel tank, the experimental data about the flow of the liquid fuel entering into the containing room or containing cavity 32 and that little liquid fuel drained from the containing room or containing cavity 32 to the fuel tank in every minute is as the following:

| Positive/Negative Pressure & Flow Record of the Horizontal Shaft Fuel Tank Cap with Charcoal Canister Positive/Negative Pressure Unit: Kpa, Flow Unit: L/Min | | | | | | | | | | |
|---|---|---|---|---|---|---|---|---|---|---|
| Positive Pressure | 1.0 | 2.0 | 3.0 | 4.0 | 5.0 | 6.0 | 7.0 | 8.0 | 9.0 | 10.0 |
| Flow | 0.07 | 1.67 | 2.75 | 3.39 | 3.82 | 4.19 | 4.72 | 5.16 | 5.40 | 5.81 |
| Negative Pressure | −2.0 | −2.5 | −3.0 | −3.5 | −4.0 | −4.5 | −5.0 | −5.5 | −6.0 | −6.5 |
| Flow | 2.47 | 2.86 | 3.13 | 3.43 | 3.72 | 4.04 | 4.20 | 4.68 | 4.75 | 4.96 |

Note:
Vertical and horizontal shaft refer to the installation of the engine.

The above-described preferred embodiment of the present invention is not intended to limit the present invention, any modification within the spirit and principles of the present invention, made by the equivalent replacement, improvement, etc., should be included in the protection of the present invention within the range.

I claim:

1. A horizontal shaft fuel tank cap with a charcoal canister, comprising:
   a fuel tank inner cap;
   a fuel tank outer cap,
   wherein a hollow cavity with an upper opening is disposed in a center of said fuel tank inner cap, said fuel tank outer cap covering said upper opening and being disposed above said fuel tank inner cap;
   a vent pipe, being disposed in said hollow cavity and being comprised of a first supporting column and a second supporting column, said first supporting column have a first diameter, said second supporting column having a second diameter, said first diameter being larger than said second diameter, said second supporting column being disposed above said first supporting column, said vent pipe dividing said hollow cavity into a filling cavity and a containing cavity, said filling cavity being disposed above said containing cavity, wherein said first supporting column is disposed in said containing cavity, wherein said second supporting column is disposed in said filling cavity, wherein said first supporting column has a first bottom end contacting a bottom of said containing cavity of said hollow cavity and a first upper end aligned with a bottom of said filling cavity of said hollow cavity, and wherein said second supporting column has a second bottom end contacting aligned with said bottom of said filling cavity of said hollow cavity and a second upper end contacting a bottom of said fuel tank outer cap;

a first air outlet being in fluid connection with said containing cavity through said bottom of said containing cavity and being disposed on said bottom of said containing cavity; and a plurality of second air outlets being in fluid connection with said containing cavity and said filling cavity through said first upper end of said first supporting column and said bottom of said filling cavity, said filling cavity containing a fuel-absorption substrate.

2. The horizontal shaft fuel tank cap with a charcoal canister, according to claim 1, further comprising:

a first breathing board covering said second air outlets and being disposed above a bottom of said filling cavity, said fuel absorption substrate being above said first breathing board.

3. The horizontal shaft fuel tank cap with a charcoal canister, according to claim 1, further comprising:

a second breathing board, covering the said fuel absorption substrate and being disposed above an upper outlet of said filling cavity.

4. The horizontal shaft fuel tank cap with a charcoal canister, according to claim 3, further comprising:

a platform supporting said second breathing board and being disposed around an upper end of said filling cavity, a protrusion being disposed on said bottom of said fuel tank outer cap and in a pushing relationship with said second breathing board downwards, and a boss supporting said second breathing board being disposed on said vent pipe.

5. The horizontal shaft fuel tank cap with a charcoal canister, according to claim 3, further comprising:

a separating pad, disposed between said fuel tank outer cap and said second breathing board.

6. The horizontal shaft fuel tank cap with a charcoal canister, according to claim 1, wherein an inner wall of said fuel tank outer cap and the upper end of said fuel tank inner cap are in a clamping engagement.

7. The horizontal shaft fuel tank cap with a charcoal canister, according to claim 1, further comprising:

a groove connecting with said containing cavity and being disposed in an upper center of said vent pipe.

8. The horizontal shaft fuel tank cap with a charcoal canister, according to claim 1, further comprising:

a slot; and an O-ring inside said slot, said slot being disposed on said bottom of said fuel tank inner cap so as to connect to a fuel tank.

9. The horizontal shaft fuel tank cap with a charcoal canister, according to claim 1, further comprising:

a stainless steel pad connected with said bottom of said containing cavity by a stainless steel rivet.

10. The horizontal shaft fuel tank cap with a charcoal canister claim 1, further comprising:

an anti-drop chain disposed and connected with said bottom of said fuel tank inner cap.

* * * * *